US008346032B2

(12) United States Patent
Schilling et al.

(10) Patent No.: US 8,346,032 B2
(45) Date of Patent: Jan. 1, 2013

(54) POF STRAIN SENSOR USING PHASE MEASUREMENT TECHNIQUES

(75) Inventors: Harry Schilling, Eichstätt (DE); Hans Poisel, Leinburg (DE); Olaf Ziemann, Nürnberg (DE); Michael Luber, Fürth (DE); Sven Loquai, Weidach (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/725,579

(22) Filed: Mar. 17, 2010

(65) Prior Publication Data

US 2010/0232740 A1    Sep. 16, 2010

Related U.S. Application Data

(63) Continuation of application No. PCT/EP2008/062343, filed on Sep. 17, 2008.

(30) Foreign Application Priority Data

Sep. 17, 2007    (EP) ...................................... 07116533

(51) Int. Cl.
*G02B 6/00*    (2006.01)
*G01J 1/04*    (2006.01)
*G01J 1/42*    (2006.01)
*G01J 5/08*    (2006.01)

(52) U.S. Cl. ..................................... 385/13; 250/227.14
(58) Field of Classification Search .................... 385/13; 250/227.14, 227.16, 227.17
See application file for complete search history.

(56) References Cited

U.S. PATENT DOCUMENTS

| | | | |
|---|---|---|---|
| 4,111,050 A * | 9/1978 | Waddoups | ................... 374/161 |
| 4,773,753 A | 9/1988 | Hirose | |
| 5,381,005 A | 1/1995 | Chazelas et al. | |
| 7,359,586 B2 * | 4/2008 | Ivtsenkov | ....................... 385/13 |
| 7,488,929 B2 * | 2/2009 | Townley-Smith et al. | ......................... 250/227.14 |
| 2003/0223079 A1 * | 12/2003 | Hill | ............... 356/500 |
| 2005/0232532 A1 * | 10/2005 | Wang et al. | ..................... 385/13 |
| 2007/0065075 A1 * | 3/2007 | Berger et al. | ................... 385/37 |
| 2007/0285669 A1 * | 12/2007 | Ajgaonkar et al. | .......... 356/482 |

FOREIGN PATENT DOCUMENTS

| | | |
|---|---|---|
| DE | 4018379 | 12/1991 |
| DE | 102005016524 | 12/2005 |
| JP | 04305111 | 10/1992 |
| JP | 2001183114 | 7/2001 |

OTHER PUBLICATIONS

"High resolution length sensing using PMMA optical fibres and DDS technology," by Doering, 15th Plastic Optical Fiber Conference, pp. 238-241, Sep. 11-14, 2006.*
Poisel "POF Strain Sensor Using Phase Measurement Techniques" 2008, Proceedings of SPIE—The International Society for Optical Engineering—Smart Sensor Phenomena Technology, Networks and Systems, vol. 6933, whole documents.
International Search Report for PCT Application No. PCT/EP2008/062343.

* cited by examiner

*Primary Examiner* — Ryan Lepisto
*Assistant Examiner* — Robert Tavlykaev

(57) ABSTRACT

An optical fiber sensor has a measurement path and a reference path. Both paths each consist of two optical fibers and are fed with modulated light. The fibers of the reference path have a predefined difference in length, whereas the fibers of the measurement path are the same length. All fibers are at approximately the same temperature. An evaluation circuit determines the phase differences in each case between the fibers of the measurement path and of the reference path. A measurement value calculated from the phase differences is then output.

37 Claims, 8 Drawing Sheets

A-A

US 8,346,032 B2

POF STRAIN SENSOR USING PHASE MEASUREMENT TECHNIQUES

PRIORITY CLAIM

This application is a continuation of pending International Application No. PCT/EP2008/062343 filed on Sep. 17, 2008, which designates the United States and claims priority from European Patent Application 07 116 533.6 filed on Sep. 17, 2007.

BACKGROUND OF THE INVENTION

1. Field of the Invention

The invention relates to an optical sensor for measuring physical parameters on industrial components and structures, in particular on rotor blades of wind power plants.

2. Description of the Relevant Art

DE 10 2005 0016524 discloses a wind power plant in which operating states or anomalies on the rotor blades are determined by means of strain gauge sensors. Electrical sensors like these strain gauge sensors have the problem of being sensitive to electrical or electromagnetic disturbances. Thus, such sensors can be disturbed or destroyed by the discharge of electrostatic charges on the rotor blades or by lightning strikes.

U.S. Pat. No. 4,773,753 discloses a fiber sensor which can be used to measure temperatures or strains. The sensor is based on a polarisation-maintaining fiber. External influences such as temperature or strain alter the polarisation of light transmitted through the fiber. At the end of the fiber, the polarisation of the light is evaluated in order to obtain information about the variables to be measured.

The use of optical sensors allows independence of electrical fields and waves to be achieved in this case. Drawbacks of using optical fiber-based sensors include their complex handling and their high mechanical sensitivity. Furthermore, sensors based on the evaluation of change in polarisation have in many cases only low resolution or accuracy.

Another problem of sensors of this type, which can measure a plurality of measurement variables such as temperature and strain simultaneously, is distinguishing which measurement variable the measurement signal was generated from. If, for example, a change in polarisation is detected, then it is not possible to unambiguously ascertain whether the change was caused by an alteration of the length of the fiber or by a change in temperature.

A sensor based on a Bragg grating, such as is disclosed in U.S. Pat. No. 7,027,672 B2, offers a higher resolution. Drawbacks of this sensor include the typically low bandwidth of the evaluation unit, so that only slow measurements in the range of a few hertz are possible. In addition, the evaluation unit is very complex and cost-intensive.

EP 0564366 A1 describes an optical fiber sensor for the temperature-compensated measurement of a mechanical deformation. The phase difference of the signals is evaluated from two measurement fibers.

SUMMARY OF THE INVENTION

The following description of various embodiments of optical rotary joints and lens systems is not to be construed in any way as limiting the subject matter of the appended claims.

The embodiments are based on the object of providing an optical sensor for detecting deformations on mechanical components, in particular on rotor blades of wind power plants, that avoids the drawbacks of the prior art and allows strain measurement in particular with improved accuracy and resolution, wherein temperature influences are to be largely compensated for. The sensor preferably has a relatively large bandwidth in the kilohertz range, is robust in its construction and is able to be manufactured simply and also economically. Furthermore, the sensor is also to be operable using visible light.

In an embodiment the optical fiber sensor is used for the temperature-compensated measurement of a mechanical deformation in a mechanical component, in particular the rotor blade of a wind power plant. The rotor blades are deformed in accordance with the wind load. The load state or other states of the rotor blades, such as for example icing-up, can be concluded by measuring the deformation of the rotor blades. In order to measure the deformation of a mechanical component such as a rotor blade, a first measurement fiber and a second measurement fiber are attached to the component. In this case, the first measurement fiber is preferably connected at at least two points to the mechanical component, so that a mechanical deformation of the mechanical component leads to a change in length of the first measurement fiber. The second measurement fiber is connected to the mechanical component in such a way that the deformation of the mechanical component leads to a different change in length from that in the measurement fiber. Thus, the second measurement fiber 11 can also be attached loosely to the mechanical component, so that a deformation of the component does not lead to a change in length of the second measurement fiber. The two measurement fibers are with a measurement signal by a first optical transmitter modulated with a modulation frequency from a signal generator. In order to divide the signal of the transmitter onto the two measurement fibers, a first Y-coupler is provided between the first optical transmitter and the two measurement fibers. The optical measurement signal from the first measurement fiber is supplied to a first optical receiver and the optical measurement signal of the second measurement fiber is supplied to a second optical receiver. In addition to this measurement signal path described here, there is a reference signal path. Thus, a first reference fiber and a reference fiber are fed with an optical reference signal. This optical reference signal is generated, depending on the embodiment, by means for generating an optical reference signal and modulated with a modulation frequency from the signal generator. The first reference fiber and the second reference fiber are preferably different lengths. The signals from these fibers are then supplied to the first optical receiver and the second optical receiver respectively and evaluated, just like the signals of the measurement path, in an evaluation unit preferably including a phase comparator, an analogue/digital converter and also a microcontroller. In an embodiment, the measurement fibers and the reference fibers used are preferably plastic optical fibers (POFs). However, in principle, other light-conducting fibers can also be used. In order to minimise mechanical influences, the first Y-coupler is attached as close as possible to the measurement fibers and connected to the mechanical component in as mechanically secure and thus vibration-free a manner as possible.

In order to evaluate the signals, a first phase difference between the two signals is determined from the first measurement fiber and the second measurement fiber. This phase difference is a measure of the difference in length, caused by the deformation of the fibers, and thus a measure of the deformation of the mechanical component. Preferably, the first measurement fiber and the second measurement fiber are thermally coupled to each other, so that changes in temperature do not lead to any additional change in the phase of the light. The comparison of the measurements from the measurement fibers and the reference fibers allows the tolerances of the remaining components involved in the measurement, such as the transmitter, receivers and also the evaluation unit, to be compensated for. Furthermore, it is also possible to compensate for the temperature dependence of the index of refraction of the fibers and thus of the phase change as a function of the change in length of the fibers. The different known lengths of the reference fibers yield a phase difference, which is dependent on the temperature. Now, if the measurement fibers and the reference fibers are approximately the same temperature, then a measurement value for a change in length can be calculated by forming the quotient of these two phase differences. Furthermore, the measurement value which is finally output is processed in accordance with the scaling factors and zero points of the measurement arrangement. This compensation allows a simple and inexpensive construction using standard components.

It is particularly beneficial to use an analogue phase comparator with an analogue/digital converter connected downstream. A digital phase comparator can also be used.

It is advantageous if the measurement fibers are connected to the mechanical component in such a way that during a deformation of the mechanical component the changes in length of the measurement fibers run in the opposite direction. This means, for example, that during a deformation of the mechanical component in a first direction the first measurement fiber is shortened in its length and the second measurement fiber is increased in its length.

In a further configuration of the invention, separate optical reference receivers are provided for the signals of the first reference fiber and the second reference fiber. Furthermore, it is advantageous if a separate phase comparator is provided for evaluating the reference signals.

In a further configuration of the invention, an electrical reference path can also be provided instead of an optical reference path. In this case, an electrical signal of the signal generator is forwarded to the phase comparator via two lines of different length. This allows at least a calibration of the phase comparator. In this way, the temperature dependence of the transmitter sensitivity can then no longer be calibrated.

In a further advantageous configuration of the invention, two optical transmitters, which are preferably fed with the same electrical signal, are provided instead of a first optical transmitter with a Y-coupler connected downstream.

A further configuration of the invention makes provision for the optical reference signal to have a different modulation frequency from the optical measurement signal. In this case, the signal generator has at least two outputs with different modulation signals, a first output activating a first optical transmitter and a second output activating a second optical transmitter.

The modulation signal can have various curve shapes. A sinusoidal curve shape is particularly advantageous when using an analogue phase comparator. A rectangular curve shape is advisable when using digital phase comparators.

In a further advantageous configuration, a different, preferably a higher, frequency is used for the measurement of the reference fibers to that used for measuring with the measurement fibers. Preferred measurement frequencies are for example 2 GHz for the reference fibers and 0.5 GHz for the measurement fibers. In particular in the measurement fibers, the modulation frequency of the optical transmitter has to be adapted to the fiber length. Thus, as the fiber length increases, the modulation frequency must be reduced. However, a higher modulation frequency allows a higher resolution. The measurement with the short reference fibers is therefore preferably carried out at a higher frequency. In principle, a higher measurement frequency also allows higher resolution or higher accuracy to be achieved.

In order to make maintenance work and installation or adjustment of the system particularly simple, the optical reference signal or the optical measurement signal has a wavelength in the visible range, preferably red.

A further embodiment is a wind power plant including an optical fiber sensor according to one of the preceding claims that is used to measure the deformation of at least one rotor blade.

BRIEF DESCRIPTION OF THE DRAWINGS

In the following, the invention will be described by way of example, without limitation of the general inventive concept, on examples of embodiment and with reference to the drawings.

Figure 1:
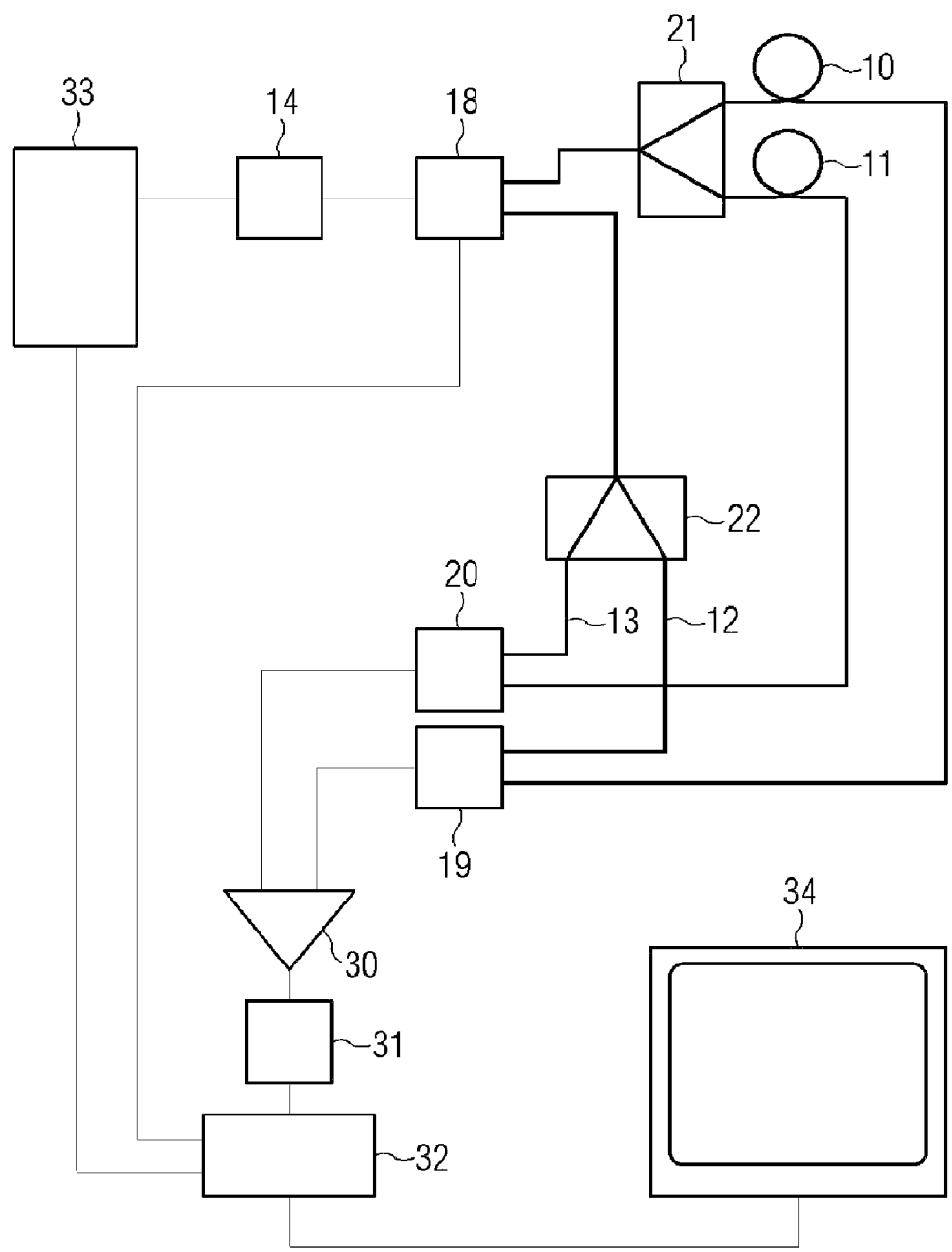
FIG. 1 shows an optical fiber sensor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows an optical fiber sensor. A signal generator 33 generates a signal for modulating a first optical transmitter 14. The output signal of the first optical transmitter 14 is selectively supplied to a first Y-coupler 21 for the measurement path or a second Y-coupler 22 for the reference path via an optical changeover switch 18. The first Y-coupler 21 divides the signal into two parts for a first measurement fiber 10 and also a second measurement fiber 11. These two measurement fibers are preferably connected to a mechanical component in such a way that the two measurement fibers are deformed in opposite directions and are in this case approximately the same temperature. The output signal of the first measurement fiber 10 is supplied to a first optical receiver 19 and the output signal of the second measurement fiber 11 is supplied to a second optical receiver 20. The output signals of the two optical receivers are compared by means of a phase comparator 30. The phase difference is converted into a digital measurement value by means of an analogue/digital converter 31 and further processed by means of a microcontroller 32. For generating a reference signal, the optical changeover switch 18 between the first optical transmitter 14 and the first Y-coupler 21 is used to switch over the signal of the measurement path into the reference path. This optical changeover switch 18 is preferably controlled by the microcontroller 32. The output signal of the changeover switch 18 for the reference path is emitted to the first reference fiber 12 and the second reference fiber 13 via the second Y-coupler 22. The two reference fibers 12, 13 are known, preferably different lengths. The known difference in length results in a known phase difference of the signal. The light from these reference fibers is likewise transferred to the first optical receiver 19 or the second optical receiver 20 for evaluation by the phase comparator. The microcontroller 32 can determine a relatively exact measurement value for the change in length of the measurement fibers from the ratio of the phase differences of the signal of the measurement fibers and the signal of the reference fibers.

Alternatively, different modulation frequencies could be predefined by the signal generator 33 for the measurement of the measurement fibers 10, 11 and for the measurement of the reference fibers 12, 13. Furthermore, the phase comparator 30 can have in its interior two phase comparators having frequency-selective properties for measuring the phase difference at the different modulation frequencies.

Figure 2:
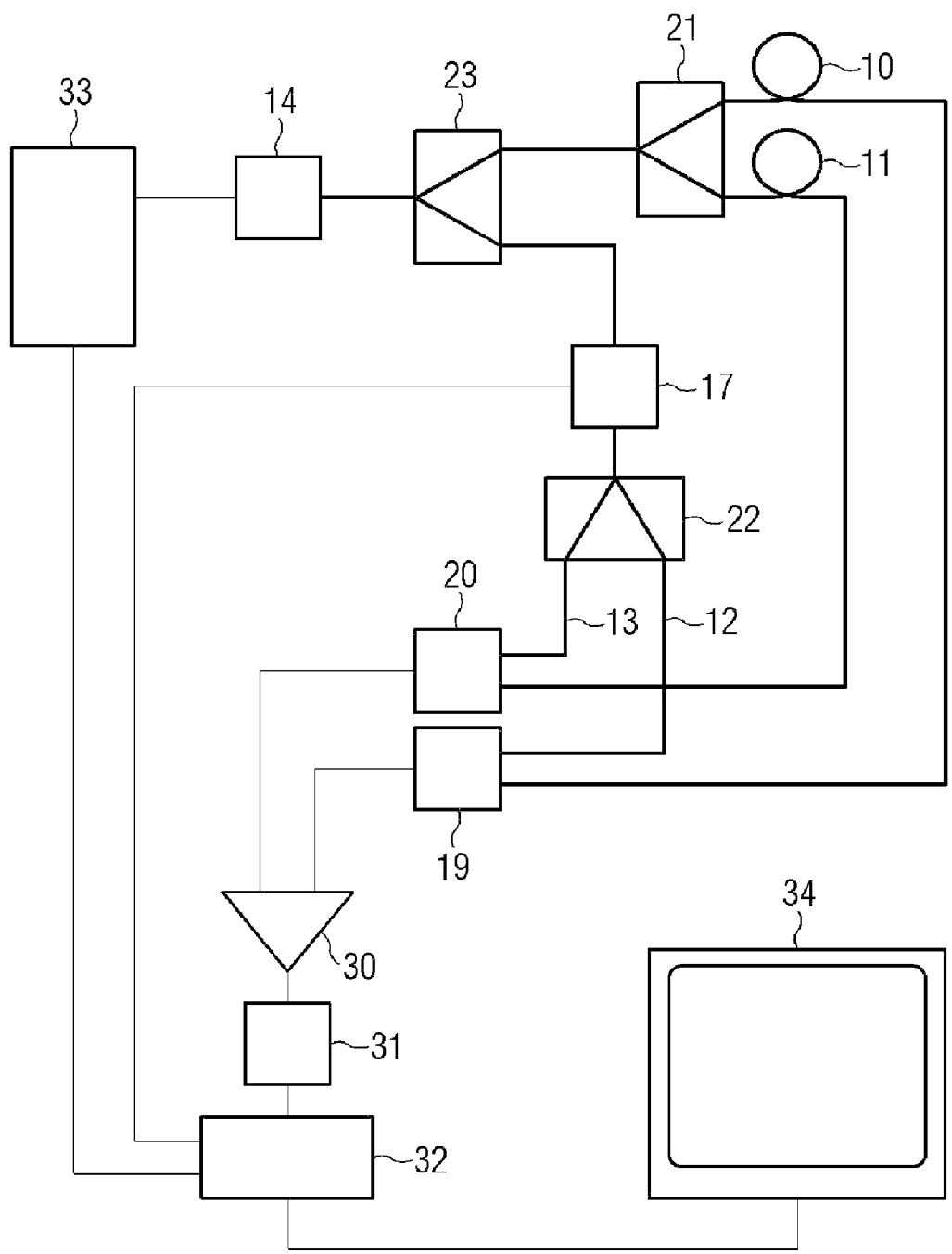
FIG. 2 shows a further configuration with an optical switch in the reference path.

FIG. 2 discloses a different configuration with an optical switch in the reference path. The output signal of the first optical transmitter 14 is split into a first signal for the measurement path, which is supplied to the first measurement fiber 10 and the second measurement fiber 11 via the first Y-coupler 21, and also a second signal for the reference path via a third Y-coupler 23. This signal for the reference path is switched on or off by means of an optical switch 17 and supplied to the first reference fiber 12 and the second reference fiber 13 via a second Y-coupler 22. When the switch 17 is switched on, this configuration uses the receivers 19, 20 to receive signals from the reference fibers and from the measurement fibers simultaneously. Typically, the reference fibers are much shorter than the measurement fibers and as a result have lower attenuation and broader bandwidth. The typical length ratio between reference fibers and measurement fibers is in a range of from 1:10 to 1:10,000. When the switch 17 is switched on, the reference signal can be evaluated effectively with high signal attenuation by the measurement fibers. In this case too, a selection can be carried out at different modulation frequencies. As the length of the measurement fibers means that they are much more narrowband, a signal at higher modulation frequency can be emitted by the transmitter 14 when the switch 17 is switched on. This signal can then be transmitted by the short reference fibers, but no longer by the longer measurement fibers. A typical ratio between the frequency for the measurement of the measurement fibers and the frequency for the measurement of the reference fibers is in a range of from 1:10 to 1:100.

Figure 3:
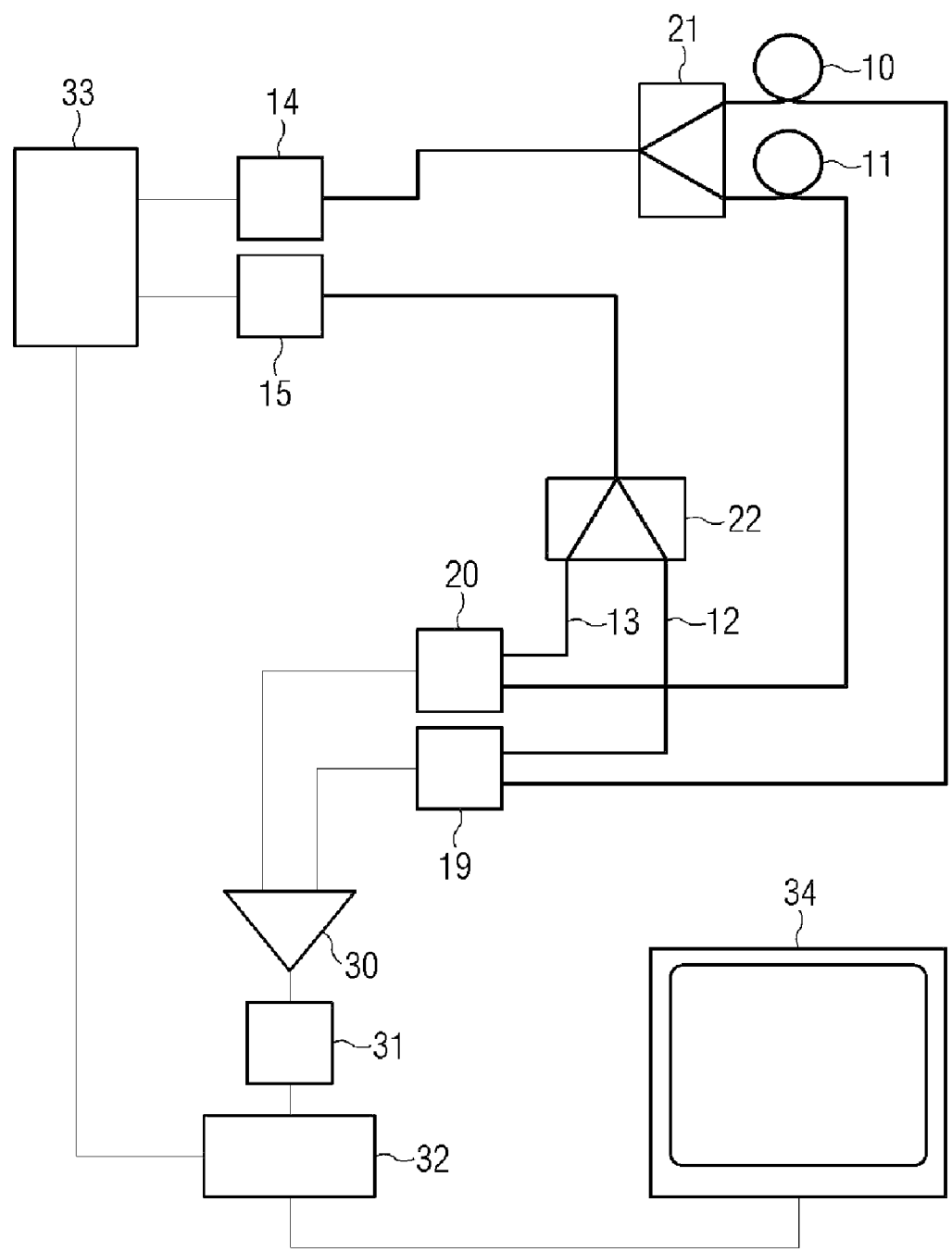
FIG. 3 shows a further configuration with a second optical transmitter for generating the reference signal.

FIG. 3 discloses a further configuration with a second optical transmitter 15 for generating an optical reference signal. In this case, the changeover switch 18 from FIG. 1 is not required. Advantageously, the signals are emitted by the first optical transmitter 14 and by the second optical transmitter 15 in a staggered manner over time, so that the phase comparator 30 receives in each case only the signals from the measurement fibers or the signals from the reference fibers. Alternatively, the first optical transmitter 14 and the second optical transmitter 15 could be modulated at different frequencies.

Figure 4:
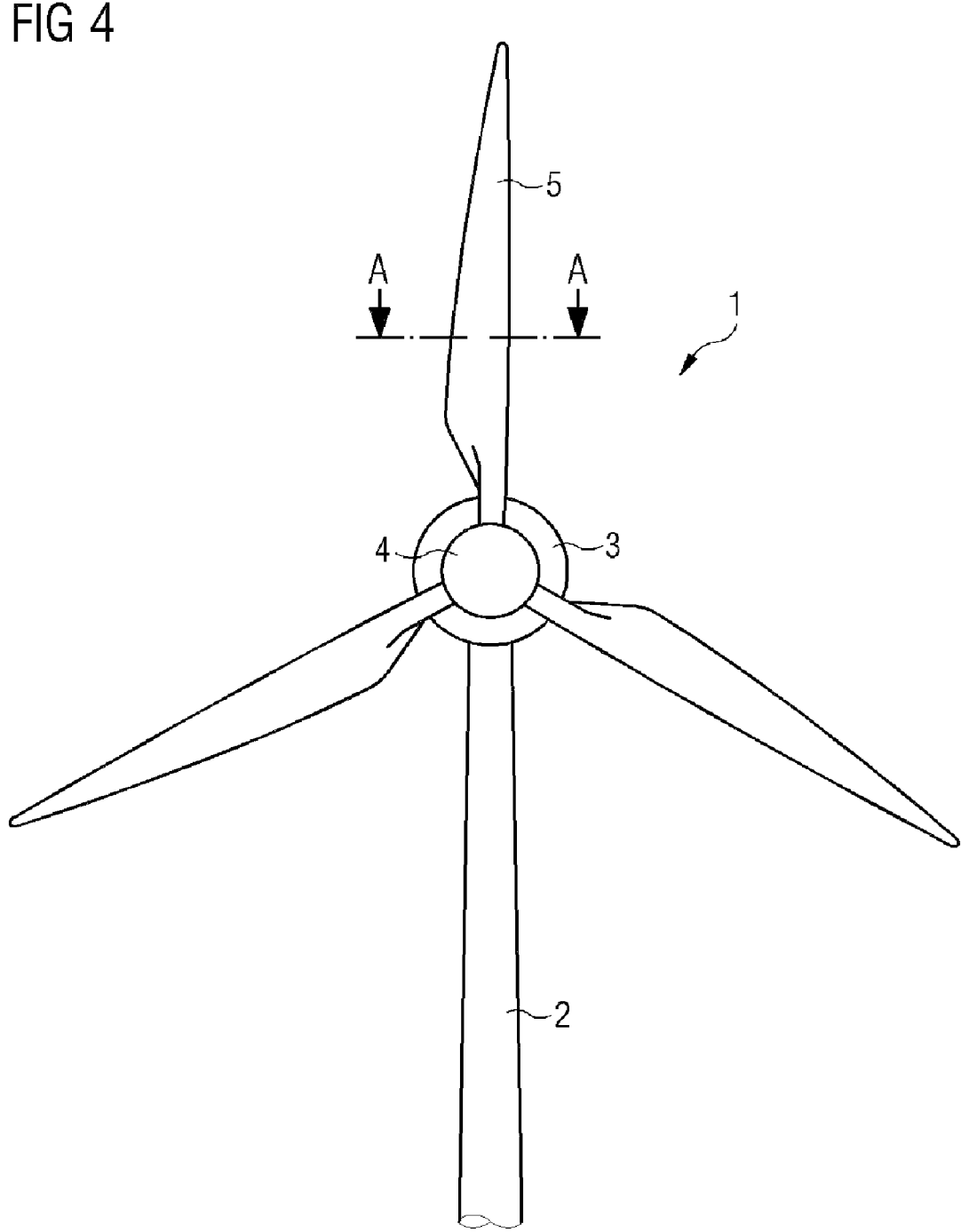
FIG. 4 shows a wind power plant.

FIG. 4 shows a wind power plant. A nacelle 3 is arranged on the tower 2. The nacelle has a rotor hub 4 for receiving the rotor blades 5.

Figure 5:
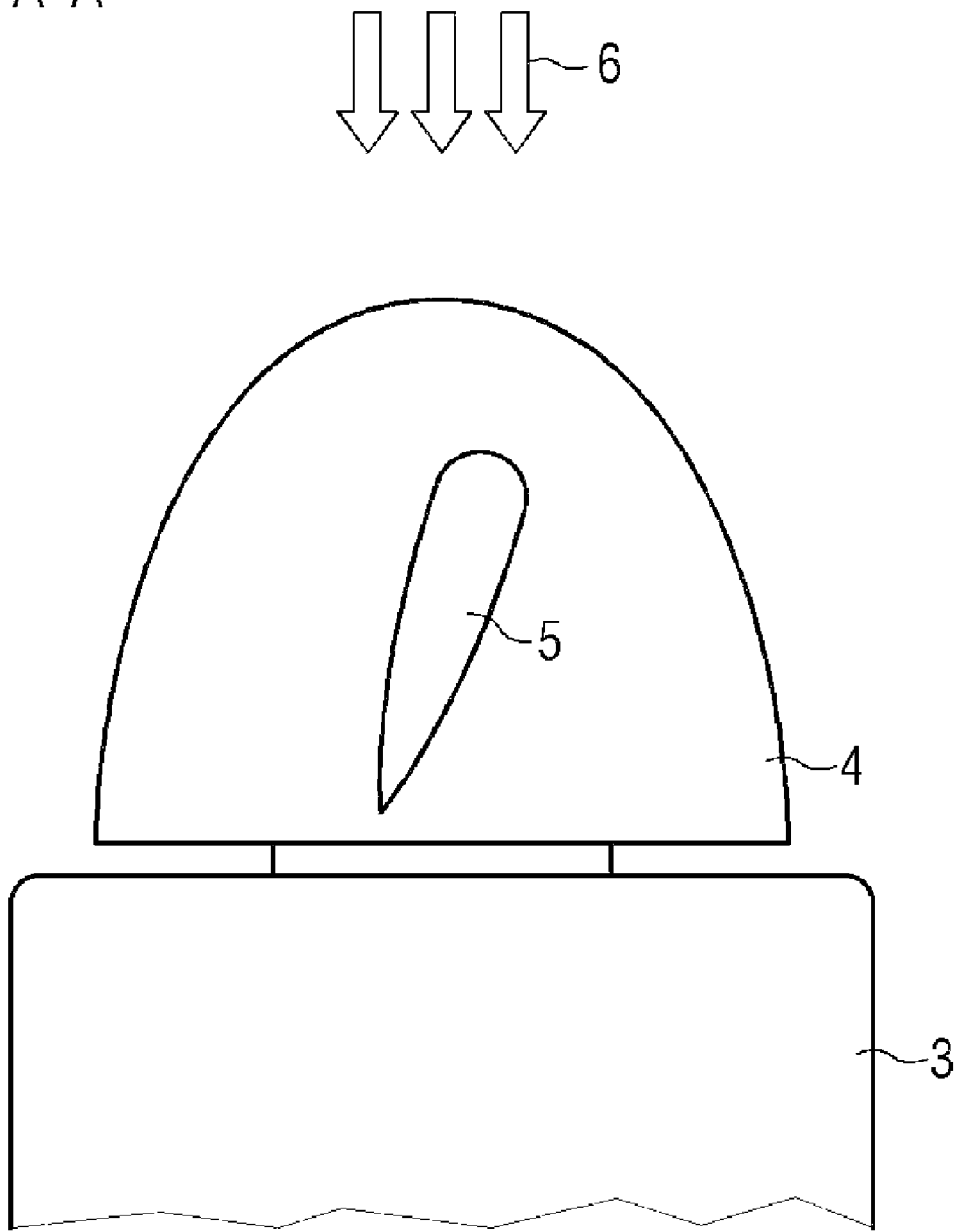
FIG. 5 is a plan view onto the wind power plant in section A-A.

FIG. 5 is a plan view onto the nacelle in section. In other words, it shows the nacelle 3 and the rotor hub 4 from above. The rotor blade is shown cut at the marked section A-A. Typically, it is possible to adjust the rotor blade in its angle in relation to the wind 6.

Figure 6:
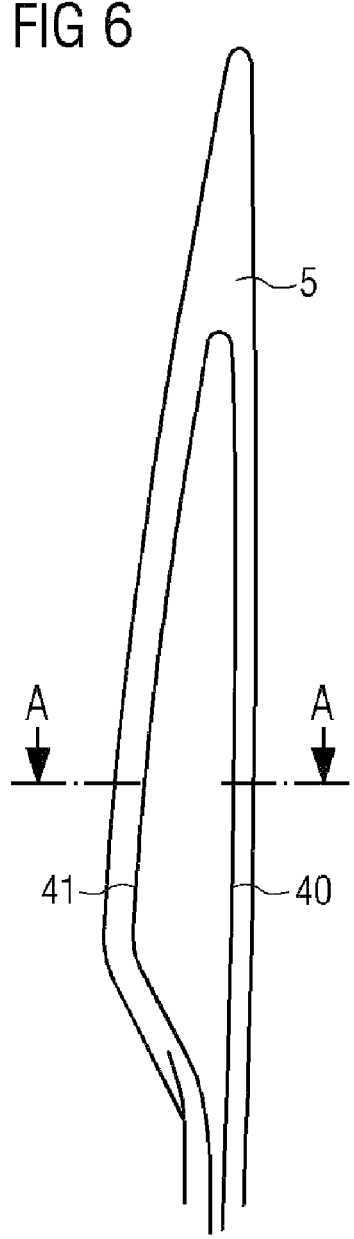
FIG. 6 is a side view of a rotor blade with a fiber sensor.

FIG. 6 is a side view of a rotor blade with a fiber sensor. This shows the first measurement fiber 10 which is arranged in a loop-shaped manner close to the upper side of the rotor blade 5. At this point, the first side (section) 40 can be connected to the first Y-coupler 21, for example, whereas the second side (section) 41 is connected to the first optical receiver 19.

Figure 7:
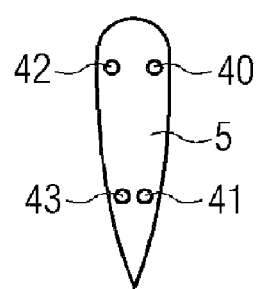
FIG. 7 shows a rotor blade with a fiber sensor in section.

FIG. 7 shows a rotor blade with a fiber sensor in section. On one side of the rotor blade, the first measurement fiber 10 is shown cut with the sections 40 and 41 from FIG. 6. The second measurement fiber 11 with the sections 40 and 41 is arranged opposing the first measurement fiber. If wind power, for example, now causes the rotor blade to be bent to the left in the view of this drawing, then the length of the first measurement fiber 10 between the sections 40 and 41 is increased, whereas the length of the second measurement fiber 11 between the sections 42 and 43 is reduced.

FIGS. 8 to 13 show various sensor arrangements of the fiber optics 10, 11. The fiber has in this case at least one feed segment 50 and a sensor segment 51. The feed segment 50 is loose, i.e. fastened to the mechanical component 5 in a mechanically uncoupled manner, and is therefore not deformed by a deformation of the mechanical component 5. The sensor segment 51 is connected to the mechanical component at least at two points, preferably at the end points thereof, particularly preferably over the entire length thereof, so that a deformation of the mechanical component causes a change of length in the sensor segment 51. An appropriate arrangement can for example be implemented by laying a fiber, in that the fiber is laid loosely in the region of a feed segment 50 and is securely adhesively bonded to the mechanical component 5 in the region of a sensor segment 51. However, it is also possible for various pieces of fiber to be connected to one another in the respective segments.

Figure 8:
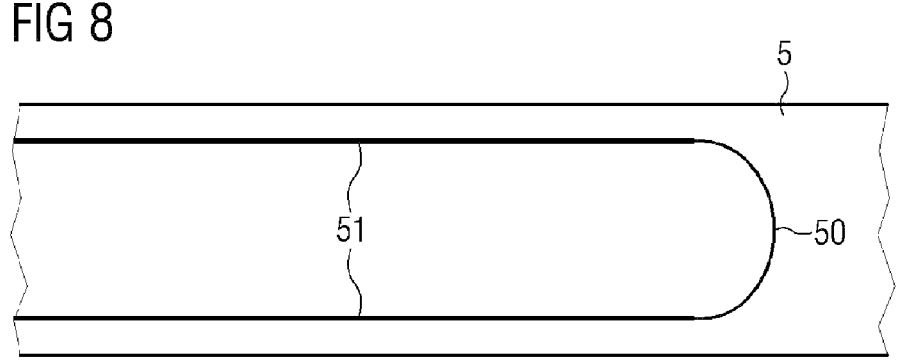
FIG. 8 shows a sensor arrangement in general form.

FIG. 8 shows a sensor arrangement in general form. In this case, at least one of the fiber optics 10, 11 or else both fiber optics is/are arranged accordingly.

Figure 9:
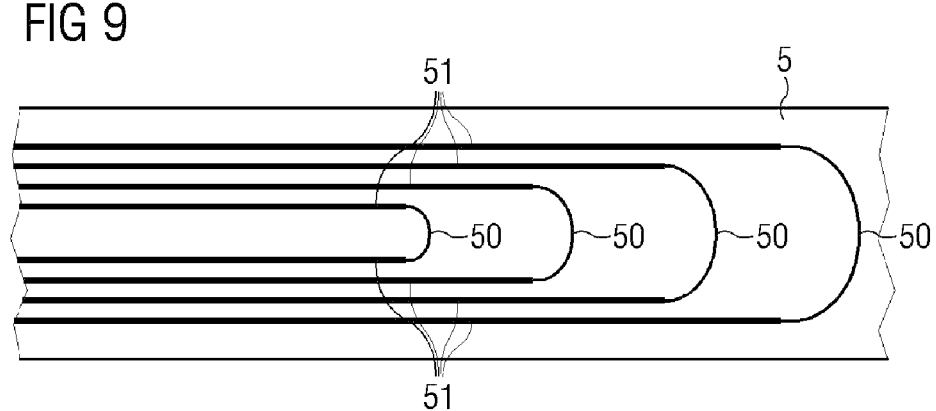
FIG. 9 shows a sensor with spatial resolution.

The sensor in FIG. 9 includes a plurality of fiber optics which are separated from one another and correspond to a plurality of fiber optics 10, thus producing a plurality of sensor circuits. The sensor circuits can then be evaluated by a plurality of evaluation devices or switched over by changeover switches on an evaluation device. In this case, measurements can be carried out at various locations.

Figure 10:
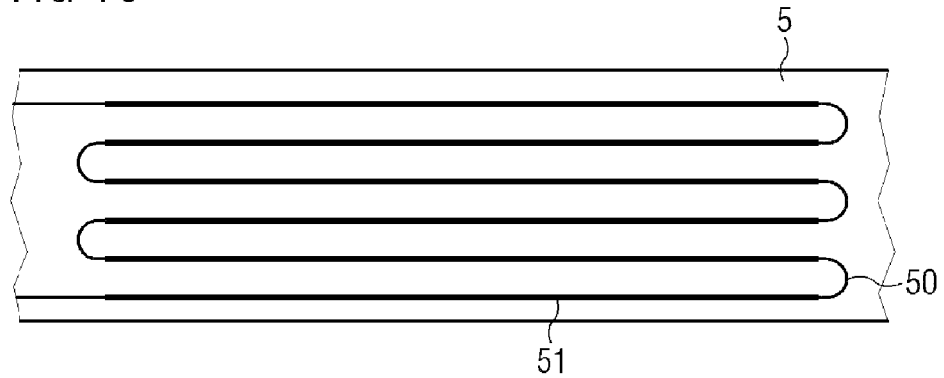
FIG. 10 shows a sensor with increased resolution.

In the sensor in FIG. 10, the resolution is increased by interconnecting a plurality of sensor segments 51.

Figure 11:
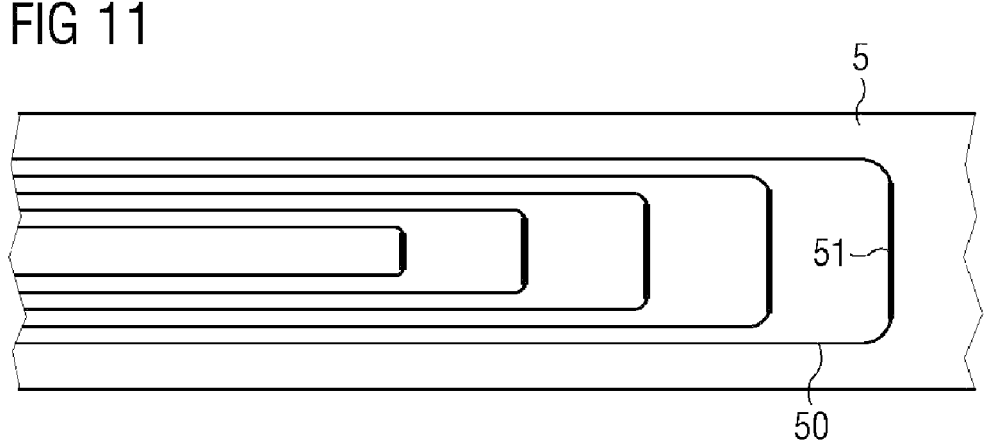
FIG. 11 shows a sensor for transverse forces with spatial resolution.

The sensor as shown FIG. 11 allows forces to be measured in the transverse direction at various locations in a manner similar to the sensor with spatial resolution from FIG. 9.

Figure 12:
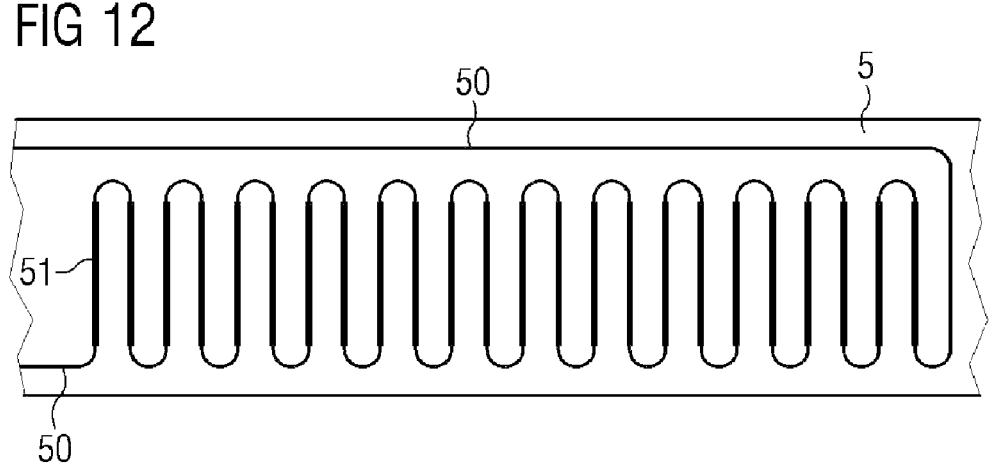
FIG. 12 shows a sensor for detecting the transverse direction.

FIG. 12 shows a sensor with high resolution under transverse forces by connecting a plurality of sensor segments 53 in parallel.

Figure 13:
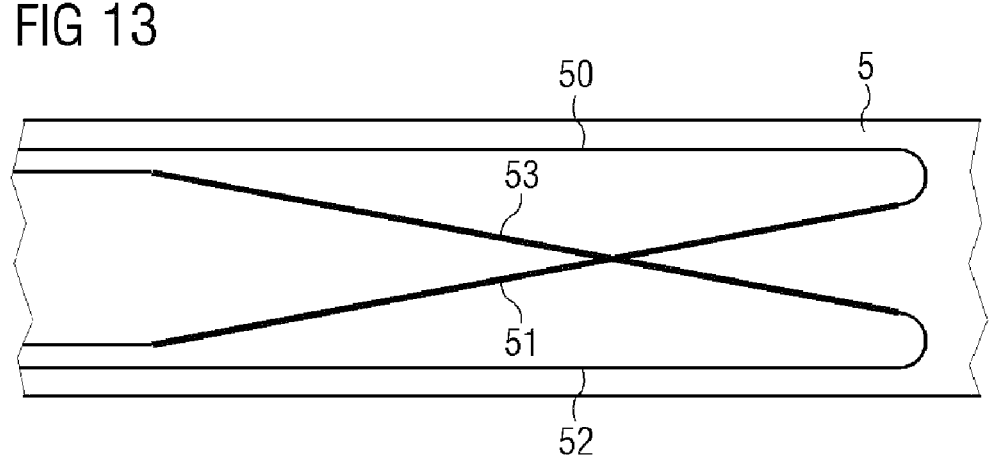
FIG. 13 shows a sensor for measuring torsion.

FIG. 13 discloses a sensor for measuring torsion, such as can particularly advantageously be used in wind power plants. In this case, a first measurement fiber 10 has a first feed segment 50 and a first sensor segment 51, for example. The second measurement fiber 11 has a second feed segment 52 and a second sensor segment 53. The arrangement of the measurement segments now allows a torsion of the mechanical component 5 to be measured.

It will be appreciated to those skilled in the art having the benefit of this disclosure that this invention is believed to provide optical fiber sensors specifically for wind power plants. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. Optical fiber sensor for a temperature-compensated measurement of a deformation in a mechanical component, comprising:
    a first measurement fiber which is connected at at least two points to the mechanical component and is changed together with the mechanical component at least partially in its length and a second measurement fiber which either is attached loosely to the mechanical component or is connected at at least two points to the mechanical component and is changed together with the mechanical component at least partially in its length;
    a first optical transmitter fed by a signal generator to generate a modulation signal having a modulation frequency and generating an optical measurement signal coupled via a first Y-coupler into the first measurement fiber and into the second measurement fiber;
    a first optical receiver for receiving an optical measurement signal passed through the first measurement fiber;
    a second optical receiver for receiving an optical measurement signal passed through the second measurement fiber;
    means for generating an optical reference signal coupled via a second Y-coupler into a first reference fiber and into a second reference fiber, wherein the first reference fiber and the second reference fiber have different lengths and output signals of the first reference fiber are supplied to the first optical receiver and those of the second reference fiber are supplied to the second optical receiver;
    an optical changeover switch for switching the first optical transmitter to either the measurement fibers or the reference fibers; and
    an evaluation unit which determines a first phase difference from the signals of the first optical receiver and of the second optical receiver while feeding-in measurement signals from the measurement fibers and also a second phase difference while feeding-in reference signals from the reference fibers and outputs a measurement value determined from the first phase difference and the second phase difference.

2. Optical fiber sensor according to claim 1, wherein the measurement fibers and the reference fibers are thermally coupled to one another or are at approximately the same temperature.

3. Optical fiber sensor according to claim 1, wherein the first measurement fiber and the second measurement fiber have approximately the same length.

4. Optical fiber sensor according to claim 1, wherein the first reference fiber and the second reference fiber have a predefined difference in length.

5. Optical fiber sensor according to claim 1, wherein the measurement fibers are connected to the mechanical component in such a way that during a deformation of the mechanical component the changes in length of the measurement fibers run in opposite directions.

6. Optical fiber sensor according to claim 1, wherein the output signals of the first reference fiber are supplied to a separate first optical reference receiver and the output signals of the second reference fiber are supplied to a separate second optical reference receiver and the evaluation unit evaluates the corresponding signals of the reference receivers.

7. Optical fiber sensor according to claim 1, wherein instead of the first optical transmitter and the first Y-coupler two optical transmitters are provided.

8. Optical fiber sensor according to claim 1, wherein the optical reference signal is modulated with a modulation signal of a frequency different to a modulation frequency of the optical measurement signal.

9. Optical fiber sensor according to claim 1, wherein a modulation signal of the optical reference signal and a modulation signal of the optical measurement signal has a sinusoidal or rectangular curve shape.

10. Optical fiber sensor according to claim 1, wherein the optical reference signal or the optical measurement signal has a wavelength in the visible range.

11. Wind power plant comprising an optical fiber sensor according to claim 1 for measuring a deformation of at least one rotor blade.

12. Optical fiber sensor for a temperature-compensated measurement of a deformation in a mechanical component, comprising
    a first measurement fiber which is connected at at least two points to the mechanical component and is changed together with the mechanical component at least partially in its length and a second measurement fiber which either is loosely attached to the mechanical component or is connected at at least two points to the mechanical component and is changed together with the mechanical component at least partially in its length;
    a first optical transmitter fed by a signal generator to generate a modulation signal having a modulation frequency and generating an optical measurement signal coupled via a first Y-coupler into the first measurement fiber and into the second measurement fiber;
    a first optical receiver for receiving optical measurement signals passed through the first measurement fiber;
    a second optical receiver for receiving optical measurement signals passed through the second measurement fiber; and
    a first reference fiber and a second reference fiber coupled to the first optical transmitter, wherein the first reference fiber and the second reference fiber have different lengths and the output signals of the first reference fiber are supplied to the first optical receiver and those of the second reference fiber are supplied to the second optical receiver;
    an optical changeover switch for switching the first optical transmitter to either the measurement fibers or the reference fibers;
    an evaluation unit which determines a first phase difference from the signals of the first optical receiver and of the second optical receiver while feeding-in measurement signals from the measurement fibers and also a second phase difference from signals supplied from the signal generator to the evaluation unit using two electrical lines, and outputs a measurement value determined from the first phase difference and the second phase difference.

13. Optical fiber sensor according to claim 12, wherein the measurement fibers and the reference fibers are thermally coupled to one another or are at approximately the same temperature.

14. Optical fiber sensor according to claim 12, wherein the first measurement fiber and the second measurement fiber have approximately the same length.

15. Optical fiber sensor according to claim 12, wherein the first reference fiber and the second reference fiber have a predefined difference in length.

16. Optical fiber sensor according to claim 12, wherein the measurement fibers are connected to the mechanical component in such a way that during a deformation of the mechanical component the changes in length of the measurement fibers run in opposite directions.

17. Optical fiber sensor according to claim 12, wherein instead of the first optical transmitter and the first Y-coupler two optical transmitters are provided.

18. Optical fiber sensor according to claim 12, wherein the modulation signal has a sinusoidal or rectangular curve shape.

19. Optical fiber sensor according to claim 12, wherein the optical measurement signal has a wavelength in the visible range.

20. Wind power plant comprising an optical fiber sensor according to claim 12 for measuring a deformation of at least one rotor blade.

21. Optical fiber sensor according to claim 1, wherein the measurement fibers and the reference fibers are thermally coupled to one another and are at approximately the same temperature.

22. Optical fiber sensor according to claim 1, wherein the optical reference signal and the optical measurement signal has a wavelength in the visible range.

23. Optical fiber sensor according to claim 12, wherein the measurement fibers and the reference fibers are thermally coupled to one another and are at approximately the same temperature.

24. Optical fiber sensor according to claim 12, wherein the two electrical lines are of different lengths.

25. Optical fiber sensor according to claim 7, wherein the two optical transmitters are fed with a same electrical signal from the signal generator.

26. Optical fiber sensor according to claim 17, wherein the two optical transmitters are fed with a same electrical signal from the signal generator.

27. Optical fiber sensor for a temperature-compensated measurement of a deformation in a mechanical component, comprising:
 a first measurement fiber which is connected at at least two points to the mechanical component and is changed together with the mechanical component at least partially in its length and a second measurement fiber which either is attached loosely to the mechanical component or is connected at at least two points to the mechanical component and is changed together with the mechanical component at least partially in its length;
 a first optical transmitter fed by a signal generator to generate a modulation signal having a modulation frequency and generating an optical measurement signal coupled via a first Y-coupler into the first measurement fiber and into the second measurement fiber;
 a first optical receiver for receiving an optical measurement signal passed through the first measurement fiber;
 a second optical receiver for receiving an optical measurement signal passed through the second measurement fiber;
 means for generating an optical reference signal coupled via a second Y-coupler into a first reference fiber and into a second reference fiber, wherein the first reference fiber and the second reference fiber have different lengths and the output signals of the first reference fiber are supplied to the first optical receiver and those of the second reference fiber are supplied to a the second optical receiver;
 an optical switch for switching the first optical transmitter to the reference fibers; and
 an evaluation unit which determines a first phase difference from the signals of the first optical receiver and of the second optical receiver while feeding-in measurement signals from the measurement fibers and also a second phase difference while feeding-in reference signals from the reference fibers and outputs a measurement value determined from the first phase difference and the second phase difference.

28. Optical fiber sensor according to claim 27, wherein the measurement fibers and the reference fibers are thermally coupled to one another or are at approximately the same temperature.

29. Optical fiber sensor according to claim 27, wherein the first measurement fiber and the second measurement fiber have approximately the same length.

30. Optical fiber sensor according to claim 27, wherein the first reference fiber and the second reference fiber have a predefined difference in length.

31. Optical fiber sensor according to claim 27, wherein the measurement fibers are connected to the mechanical component in such a way that during a deformation of the mechanical component the changes in length of the measurement fibers run in opposite directions.

32. Optical fiber sensor according to claim 27, wherein the output signals of the first reference fiber are supplied to a separate first optical reference receiver and the output signals of the second reference fiber are supplied to a separate second optical reference receiver and the evaluation unit evaluates the corresponding signals of the reference receivers.

33. Optical fiber sensor according to claim 27, wherein instead of the first optical transmitter and the first Y-coupler two optical transmitters are provided.

34. Optical fiber sensor according to claim 27, wherein the optical reference signal is modulated with a modulation signal of a frequency different to a modulation frequency of the optical measurement signal.

35. Optical fiber sensor according to claim 27, wherein a modulation signal of the optical reference signal and a modulation signal of the optical measurement signal has a sinusoidal or rectangular curve shape.

36. Optical fiber sensor according to claim 27, wherein the optical reference signal or the optical measurement signal has a wavelength in the visible range.

37. Wind power plant comprising an optical fiber sensor according to claim 27 for measuring a deformation of at least one rotor blade.

* * * * *